United States Patent
Jorgenson

(10) Patent No.: US 10,873,556 B2
(45) Date of Patent: Dec. 22, 2020

(54) SYSTEMS AND METHODS FOR COMPILING, CURATING, AND SHARING DIGITAL CONTENT

(71) Applicant: Heather Noell Jorgenson, Brentwood, CA (US)

(72) Inventor: Heather Noell Jorgenson, Brentwood, CA (US)

(73) Assignee: Urban2Suburban Innovations, LLC, Brentwood, CA (US)

( * ) Notice: Subject to any disclaimer, the term of this patent is extended or adjusted under 35 U.S.C. 154(b) by 14 days.

(21) Appl. No.: 14/799,020

(22) Filed: Jul. 14, 2015

(65) Prior Publication Data

US 2016/0036756 A1    Feb. 4, 2016

Related U.S. Application Data

(60) Provisional application No. 62/024,239, filed on Jul. 14, 2014, provisional application No. 62/081,754, filed on Nov. 19, 2014.

(51) Int. Cl.
    *H04L 12/58*      (2006.01)

(52) U.S. Cl.
    CPC ................... *H04L 51/32* (2013.01)

(58) Field of Classification Search
    CPC ............... G06F 17/30864; G06F 17/27; G06F 17/3064; G06Q 50/01
    See application file for complete search history.

(56) References Cited

U.S. PATENT DOCUMENTS

| | | | | |
|---|---|---|---|---|
| 7,697,791 | B1* | 4/2010 | Chan | G06Q 30/0263 382/305 |
| 2009/0319449 | A1* | 12/2009 | Gamon | G06F 17/30014 706/12 |
| 2010/0293049 | A1* | 11/2010 | Maher | G06Q 30/02 705/14.46 |
| 2011/0282893 | A1* | 11/2011 | Dolin | G06Q 10/10 707/769 |
| 2012/0192225 | A1* | 7/2012 | Harwell | H04N 21/2668 725/34 |
| 2012/0245925 | A1* | 9/2012 | Guha | G06F 17/27 704/9 |
| 2012/0271868 | A1* | 10/2012 | Fukatani | G06F 3/0608 707/822 |
| 2013/0060860 | A1* | 3/2013 | Myslinski | G06Q 10/10 709/204 |
| 2013/0097186 | A1* | 4/2013 | van Hoff | G06F 16/3322 707/749 |
| 2015/0248736 | A1* | 9/2015 | Myslinski | G06Q 10/06 705/319 |
| 2015/0281307 | A1* | 10/2015 | Hartwell | H04L 65/604 709/219 |

\* cited by examiner

*Primary Examiner* — William G Trost, IV
*Assistant Examiner* — Christopher P Cadorna
(74) *Attorney, Agent, or Firm* — Kramer Levin Naftalis & Frankel LLP

(57) ABSTRACT

Systems and methods are disclosed for compiling, curating, and sharing digital content. A content clearinghouse server can compile digital content items received from a number of content sources and curate the digital content items for a user of a client device. The content clearinghouse server can also receive information from client devices to be broadcast to a number of different platforms. Digital content items received from content sources and broadcast information can each be de-duplicated at the content clearinghouse server.

7 Claims, 12 Drawing Sheets

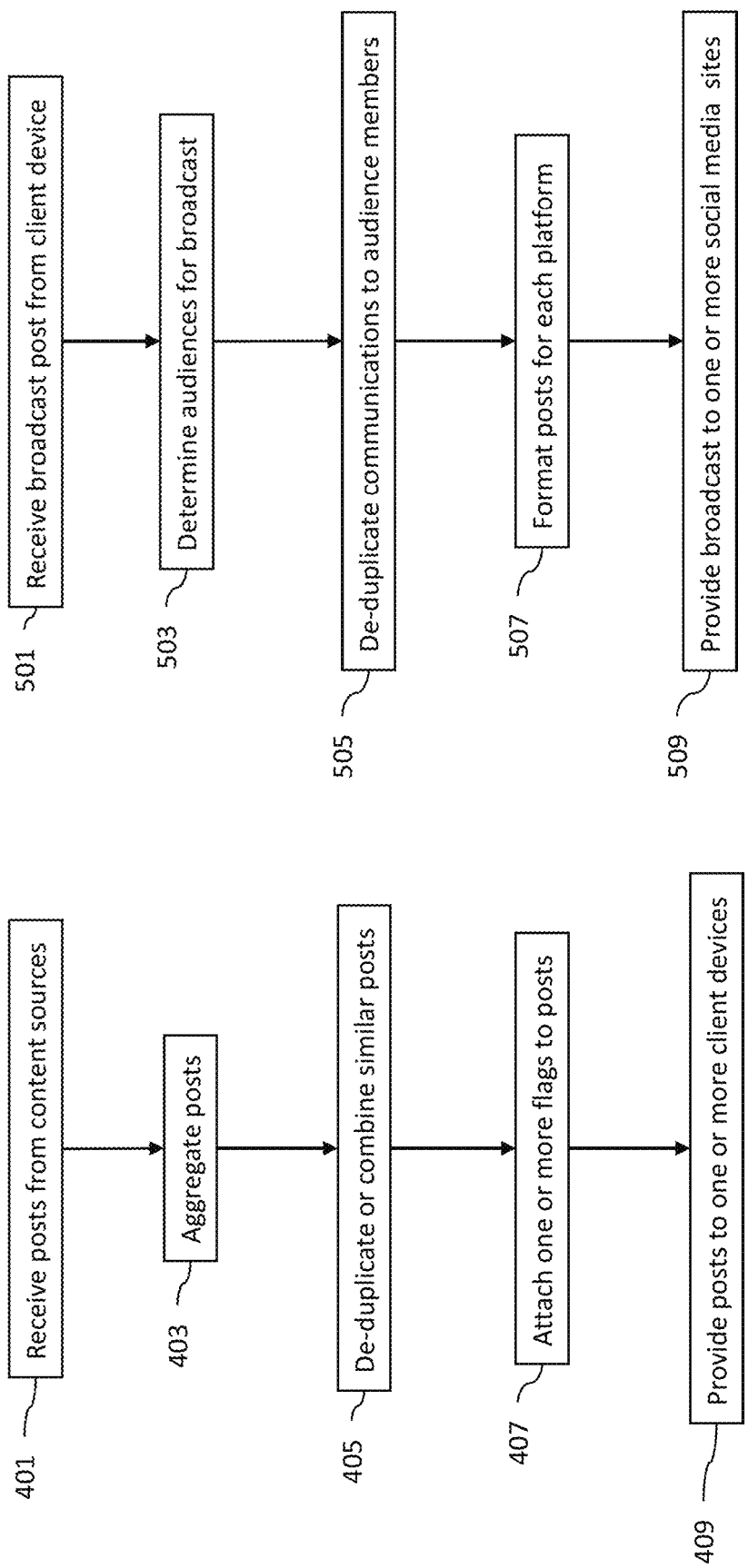

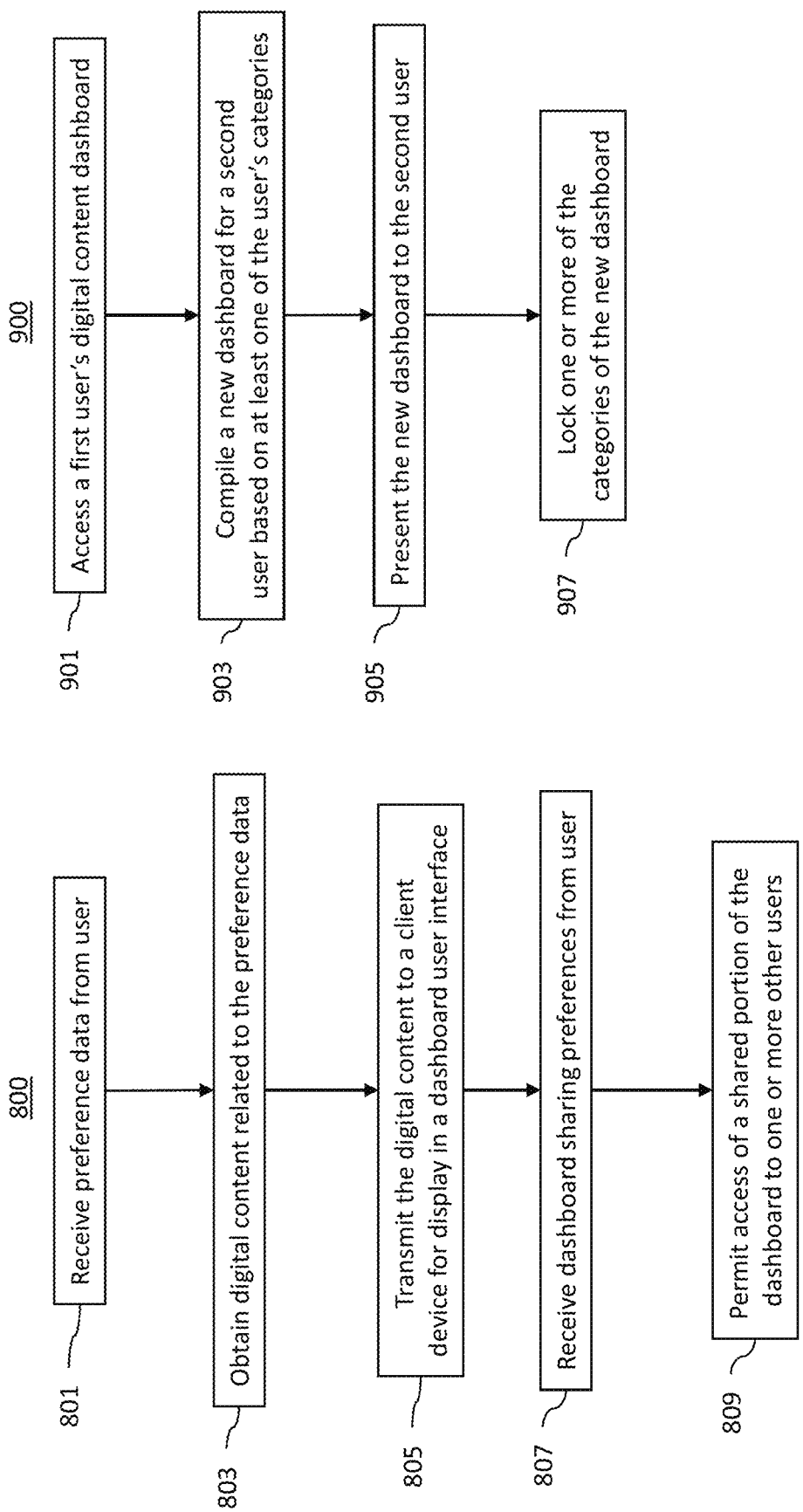

MY LOCKER
Fantasy Sports

1000a

Football | Baseball | Hockey

- Private League 1
- Private League 2
- Public League 1
- Public League 1

Lineup | Standings | Wagers

Seasonal Wagers | Weekly Wagers | Oddball Wagers

| Team 1 | Team 2 |
| 8-2-0 \| 1st | 5-5-0 \| 8th |
| Projected Points: 123.05 | Projected Points: 140.34 |
| Weekly Wager: Cigars | Weekly Wager: Steaks |

| Team 3 | Team 4 |
| 2-8-0 \| 13th | 6-4-0 \| 6th |
| Projected Points: 95.74 | Projected Points: 140.34 |
| Weekly Wager: Whiskey | Weekly Wager: Beer |

| Team 5 | Team 6 |
| 8-2-0 \| 1st | 5-5-0 \| 8th |
| Projected Points: 123.05 | Projected Points: 140.34 |
| Weekly Wager: None | Weekly Wager: None |

Wagerables:
- Choose Local Item
- Search Opponent's Items
- Search Retail Items
- Search All Items

| MY LOCKER | FRIENDS | Current Bets | Won | Lost/Owed |
|---|---|---|---|---|
| COMMUNITY | Steve S. | Headphones | B-Ball Jersey | Drinks |
| FRIENDS | | Tablet | Golf | Tablet |
| FANTASY TEAMS | | Lunch | Scotch | |
| WAGERING | Junji | Watch | Driver | Trip to Hawaii |
| FAV ITEMS | | Putter | Concert Tix | |
| MUSIC | Kirk J. | Bacon | Cigars | Kobe Beef |
| EVENTS/TICKETS | | Scotch | | |
| TRAVEL | | | | |
| NEWS | | | | |
| SEARCH | | | | |

SYSTEMS AND METHODS FOR COMPILING, CURATING, AND SHARING DIGITAL CONTENT

CROSS-REFERENCE TO RELATED APPLICATIONS

This application claims the benefit of U.S. Provisional Patent Application Ser. No. 62/024,239, entitled "SYSTEMS AND METHODS FOR COMPILING, CURATING, AND SHARING DIGITAL CONTENT," filed Jul. 14, 2014, which is hereby incorporated by reference in its entirety. This application also claims the benefit of U.S. Provisional Patent Application Ser. No. 62/081,754, entitled "SYSTEMS AND METHODS FOR COMPILING, CURATING, AND SHARING DIGITAL CONTENT," filed Nov. 19, 2014, which is hereby incorporated by reference in its entirety.

BACKGROUND

Digital devices like PCs, laptops, tablets, and smartphones Digital devices like PCs, laptops, tablets, and smartphones are playing an ever-increasing role in affecting behaviors as diverse as how we work and play, how we make and sustain relationships, how we consume music, news, entertainment, and social content, and how even how we decide what we like and what we don't. At the moment, the digital content we consume using these devices tends to be unorganized and located in a wide variety of locations. Finding desirable content in the wide proliferation of available websites, programs, and applications can be a daunting task, and many simply limit content consumption to a few limited, trusted sources lest they become overwhelmed by the vast task of finding the proverbial needle in the haystack.

A number of platforms exist that attempt to manage our digital lives. For instance, some applications consolidate news articles, blog posts, and other content from diverse sources into a single interface. However, these platforms all fall short of providing a fully compiled and curated experience for organizing, sharing, and presenting all of a user's digital content.

SUMMARY

In some embodiments, a centralized user interface may be provided for presenting social media content from various social media sources. Social media content from various social media sources with which a user is affiliated, usually embodied in "posts," may be presented in the centralized user interface in one continuous, integrated "feed." Depending of the source of the social media content, a post presented in the centralized user interface may be reformatted to blend in with the look and feel of the centralized user interface. In some embodiments, the centralized user interface may be integrated into an operating system of a client device, while in other embodiments, the centralized user interface may be provided via a stand-alone application that may be installed on a client device.

Similar or identical posts received from multiple social media sources and/or multiple social media contacts may be de-duplicated and/or combined at a content clearinghouse server before they are presented in the feed to prevent the feed from becoming cluttered with duplicated content. Outgoing posts may be directed to several different social media sources simultaneously. To prevent the user's social media contacts from receiving the outgoing post on each of their respective social media sources, the content clearinghouse server may also determine the audience for the post on each social media source and alter the audience for the outgoing post to minimize duplicate communications as practicable.

Posts may also be displayed along with one or more flags. The flags may quickly and clearly communicate information about the post that may help the user determine whether or not to view, share, like, comment, or otherwise interact with the post. One flag could be a fact checking indicator (e.g., a stoplight style icon) that indicates whether the content associated with post has been checked for accuracy by an independent third-party source. Another flag could indicate that the content associated with the post might be inappropriate for children, work, etc. Yet another flag could indicate that the post is a paid advertisement.

In some embodiments, a content dashboard may be provided for gathering, organizing, and sharing a user's digital content. The digital content may include a user's personal digital content (e.g., pictures, videos, music, documents, email messages, and calendar entries) and nonpersonal, curated web content (e.g., pictures, videos, news articles, social media posts, and critical reviews). One or more portions of the dashboard may be shared with other users. The other users may be other users of an application that provides the dashboard, users of other social media sites, or to the public at large via a publically accessible Internet website. Digital content displayed in the dashboard may be prioritized differently according to the time of day and/or the day of the week, which may correlate with the type of digital content the user may most wish to interact with.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIGS. 4 and 5 show illustrative flowcharts of processes for presenting social media content from and broadcasting posts to various social media sources, in accordance with some embodiments;

FIGS. 8 and 9 show illustrative flowcharts of processes for gathering, organizing, and sharing a user's digital content, in accordance with some embodiments; and FIGS. 10A-10D show exemplary user interfaces for gathering, organizing, and sharing a user's digital content, in accordance with some embodiments.

DETAILED DESCRIPTION OF THE DISCLOSURE

Systems and methods for compiling, curating, and sharing digital content are disclosed. These systems and methods can help to streamline a user's experience while consuming digital content by aggregating digital content from various sources in a single user interface environment and by facilitating the sharing of digital content with other users via the same environment.

Figure 1:
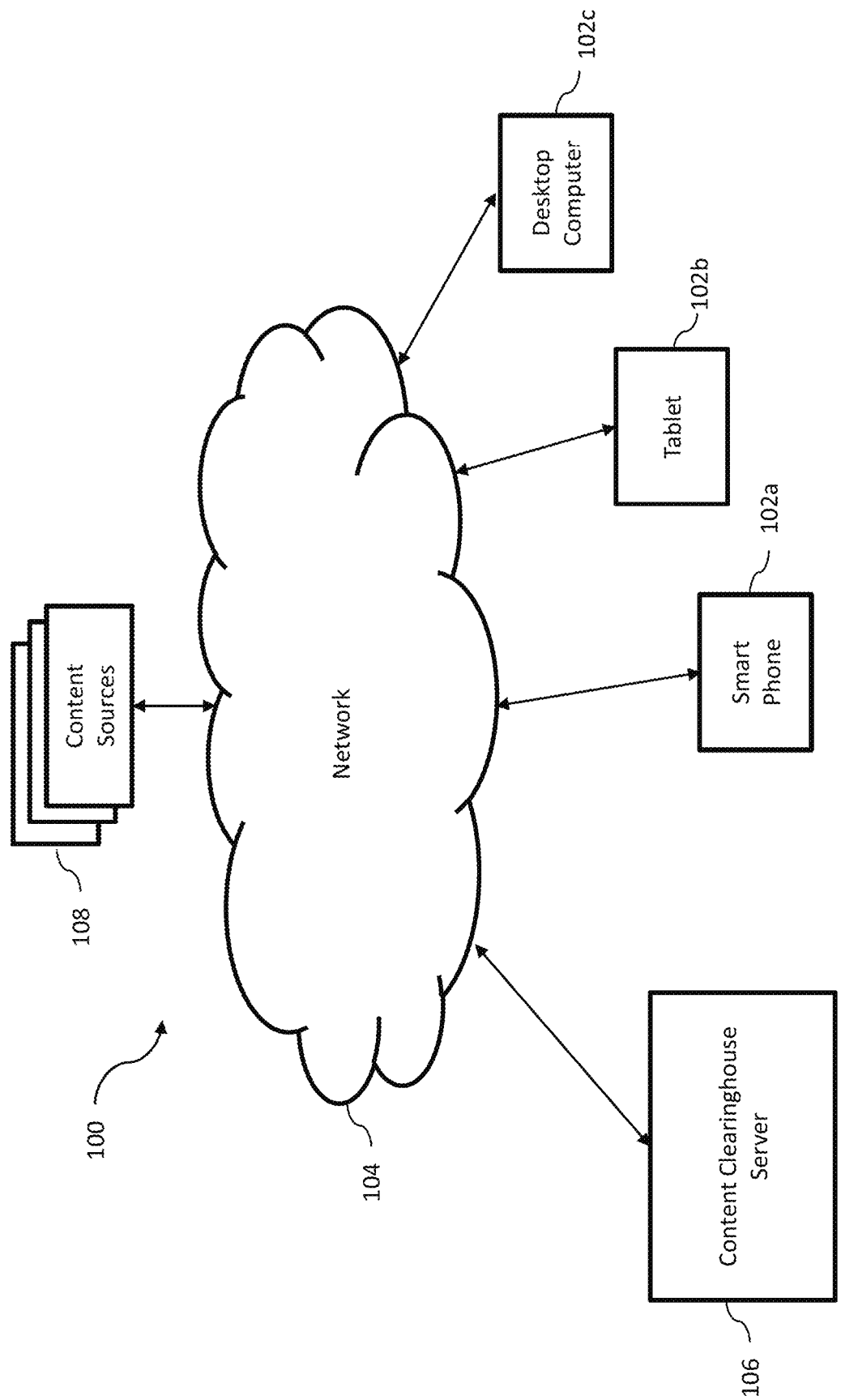
FIG. 1 depicts a schematic diagram of a network system for compiling, curating, and sharing digital content, in accordance with some embodiments.

FIG. 1 depicts a schematic diagram of system 100 for compiling, curating, and sharing digital content, in accordance with some embodiments. System 100 may include client devices 102a, 102b, and 102c in communication with content clearinghouse server 106 and content sources 108 via network 104. While client devices 102a, 102b, and 102c (collectively client device 102) are depicted as representing a smartphone, a tablet, and a desktop computer, respectively, one skilled in the art will recognize that client device 102 may be any type of electronic device capable of communicating with another electronic device via network 104. Network 104 may be any suitable network, such as the Internet, for example.

Content clearinghouse server 106 may be a computing device capable of communicating with client device 102 and content sources 108 via network 104. Content sources 108 may include any digital content source accessible via network 104, including but not limited to email and instant messaging, and calendaring servers, as well as social media websites, news websites, sports websites, ecommerce websites, trade websites, scholarly journals, blogs, forums, webcomics, and online games, and/or servers hosting the same.

In some embodiments, content clearinghouse server 106 may receive digital content from content sources 108. The digital content received from content sources 108 may be based on user preferences defined by a user of client device 102. For example, a user may indicate his interest in receiving digital content from one or more known content sources, such as one or more particular social media or news websites. If necessary, the user may provide his credentials for one or more content sources 108 with which he is associated to enable content clearinghouse server 106 to communicate with username/password-protected content sources. The user may also indicate his interest in one or more content categories. For those content categories, content clearinghouse server 106 may consult a database of content sources known to be associated with the indicated content categories and pull digital content from those content sources. Digital content may arrive at content clearinghouse server 106 from content sources 108 relatively unfiltered, in that all content available from content sources deemed to be of interest to the user of client device 102 may be received at content clearinghouse server 106.

Content clearinghouse server 106 may compile and curate digital content received from content sources 108. Compiling and curating the digital content may involve determining how relevant each particular digital content item is likely to be to the user's interests. Content clearinghouse server 106 may rely on a points-based algorithm to determine the likely relevance of a particular content item to the user. For example, content clearinghouse server 106 may examine metrics associated with the digital content item (e.g., how many times the digital content item has been viewed, shared, commented on, etc.), whether the digital content item was generated or shared by one or more social media contacts, the frequency with which the user previously interacted with similar digital content items.

In some embodiments, points awarded to a given digital content item may vary depending on the type of digital content item in question. For example, the scheme for awarding points to an article from a news website may vary from the scheme for awarding points to a social media post. For instance, the identity of the person who authored a social media post may be more relevant to a user than the author a news article, the digital content author's identity may be given more weight in the former case than in the latter. The number of points awarded to a particular content item may decay over time to ensure that fresh content is more highly rated than stale content. Still further, different types of content may have different "point multipliers" depending on the time of day and the day of the week. For example, news articles, which many people prefer to read in the morning, may be awarded a point multiplier (e.g., 2×, 3×, 10×, etc.) during the hours of 5-10 am, Monday-Friday; the point multiplier may be removed outside of that timeframe. Further yet, the user's history of interactions with digital content items may be used to alter how points are awarded to various types of digital content items, such that digital content items that user interacts with frequently (e.g., news articles about environmental issues) are awarded "bonus points" over other types of news articles.

Content clearinghouse server 106 may provide the compiled and curated digital content to client device 102. In some embodiments, the points awarded to each digital content item may be used to curate the digital content items received from content sources 108 according to the user's stated tastes. Curating the digital content items may be accomplished in a number of ways. In a first embodiment, only a defined number of digital content items (e.g., 100) may be selected for transmission to client device 102. Accordingly, the top 100 digital content items, as ranked by content clearinghouse server 106 may be provided to client device 102. In other embodiments, any digital content item reaching a defined point threshold may be provided to client device 102. It should be understood that providing a digital content item for client device 102 may involve an actual transfer of the digital content item itself (e.g., a copy of an article, song, document, etc.) or a transfer of a link to a location where the digital content item may be retrieved (e.g., a link to an article on a website).

In some embodiments, all or a portion of the curated content may be downloaded to and stored and stored on client device 102 at a time when client device 102 has an active connection to network 104. Accordingly, the curated content may be consumed even if client device 102 later loses connectivity to network 104. Client device 102 may be configured to automatically update periodically (e.g., once daily at a time when client device 102 is connected to network 104). Client device 102 may also be configured to update only when manually prompted by the user, or client device 102 can receive "push" updates, which may be received at any time client device 102 is connected to network 104.

While awarding points to the various digital content items, content clearinghouse server 106 may de-duplicate and/or combine similar digital content items to avoid multiple copies (or similar versions) of a digital content item from being provided to client device 102. Recognition of similar or identical digital content items may involve, for example, parsing text associated with the digital content item (e.g., from the body of the digital content item or from metadata associated with the digital content item) and comparing keywords, hashtags, quotations, date of generation, content source, and/or other attributes of the potentially duplicative digital content items. Thus, if several of a user's social media contacts share the same article with the user, content clearinghouse server 106 can recognize the duplicative copies and either decline to provide them to client device 102. In other embodiments, similar copies of a digital content item (e.g., breaking news articles on a topic from different news outlets) can be combined and transmitted as a bundled digital content item to client device 102. Bundled content items may be identified by a meta-description of the bundled digital content item and provide the user access to each individual digital content item in the bundle. Thus, even if a large number of news outlets are generating articles covering the same story (e.g., a presidential election) only a single bundled content item may be transmitted to client device 102, whereupon the user may determine which content source 108 to go to for coverage of the story.

According to some embodiments, content clearinghouse server 106 may also receive digital content from client device 102. The digital content received from client device 102 may be any digital content accessible to client device 102. Accordingly, the digital content may include, for example, personal digital content items stored locally on client device 102 (e.g., music files, documents, videos, etc.), personal digital content items stored on a cloud-based server accessible to client device 102, or any other digital content items accessible by client device 102 (e.g., from content sources 108). In some embodiments, a given digital content item received from client device 102 may be formatted as a post to one or more social media or content sharing sites. Accordingly, rather than sharing digital content items from client device 102 directly to another user's client device, social media site, or a cloud-based storage site, digital content items may first be routed through content clearinghouse server 106.

In some embodiments, content clearinghouse server 106 may determine an audience for a post and, to the extent possible, de-duplicate reception of the post by a particular user via more than one platform. Determining the audience for the post may include determining to which platforms the post is being broadcast, determining which users of those platforms would receive the post if it was not de-duplicated, and limiting the audience as possible to prevent a particular user from receiving the post via more than one platform. For example, a user of client device 102 may broadcast a particular post to a one or more social media sites, email distribution lists, SMS or MMS lists, multi-user cloud storage systems, or any other suitable platforms. Content clearinghouse server 106 may intercept the broadcast and determine, for each platform, a list of users who will receive the post (if not for de-duplication), cross-reference the users on each list, and eliminate one or more transmission modes to users found to be represented in more than one list. Thus, if a particular user is found, based on the cross-referencing, to be receiving the post via two social media sites, email, and MMS, content clearinghouse server 106 may decline to transmit the post to the user by one or more of those methods (e.g., email and MMS).

In some embodiments, content clearinghouse server 106 may maintain a database of a user's contacts that cross-references each of the contact's aliases across different platforms. Thus, the database may include a list of individuals paired with their aliases (e.g., usernames, email addresses, phone numbers, usernames, handles, etc.) for each platform. The database may also indicate, as applicable for each platform, how the individual is related to the user of client device 102. For instance, because many social media sites allow users to specify how they are related (e.g., as friends, family, colleagues, acquaintances, followers, etc.), these relationships may be used to define an audience for a particular post. Accordingly, these relationships may help to determine the audience for a particular broadcast, and they may be used to de-duplicate communications to users (e.g., by helping to narrow the audience to receive the post via a particular platform). Information regarding individuals in the database may be culled and compiled from data stored on client device 102, data received from each platform via network 104, or data entered, combined, or confirmed manually by a user of client device 102.

In some implementations, de-duplication of a broadcast post may be limited to relatively personal communications such as email, SMS, MMS, or direct messaging via a social media site. These relatively personal communications may be contrasted with public or semi-public communications, such as posts to public or semi-public social media sites. As used herein, the term public may refer to communications that are not restricted to a particular audience, the term semi-public may refer to communications that are restricted to a class of users (e.g., friends on a social media site), and the term personal may refer to communications that are directed to individuals (e.g., an email, SMS, MMS, instant message, or direct message). Accordingly, de-duplication may prevent an individual from receiving the post via email, SMS, MMS, instant message, and direct message, even if all of those methods were chosen for the broadcast.

In the case of semi-public communications, the ability to de-duplicate a broadcast post may depend on the how each semi-public platform permits narrowing an audience for a post. Content clearinghouse server 106 may, for these types of communications, de-duplicate communications only the extent practicable given the platform permissions. However, in the event that an individual user is "tagged" in multiple versions of a post being broadcast to several public, semi-public, or private communications platforms, content clearinghouse server 106 may remove the tag for all but one communications mode so that the user is not tagged multiple times across multiple platforms for the same post.

The database may further include data indicating each individual's preferred contact method. The preferred contact method may be obtained, for example, via user preferences gleaned from the information received at content clearinghouse server 106 from one or more platforms, via manual entry by the user of client device 102, and/or via default rules or user-specific preferences defined for content clearinghouse server 106. Conflicts in the preferred contact method for an individual may be resolved in any suitable manner (e.g., by giving the individual's preferred contact method over the user's preferred contact method or vice versa). Thus, when de-duplicating a broadcast post, content clearinghouse server 106 may consult the database to determine each individual's preferred contact method when determining how to transmit the post to each individual.

Figure 2:
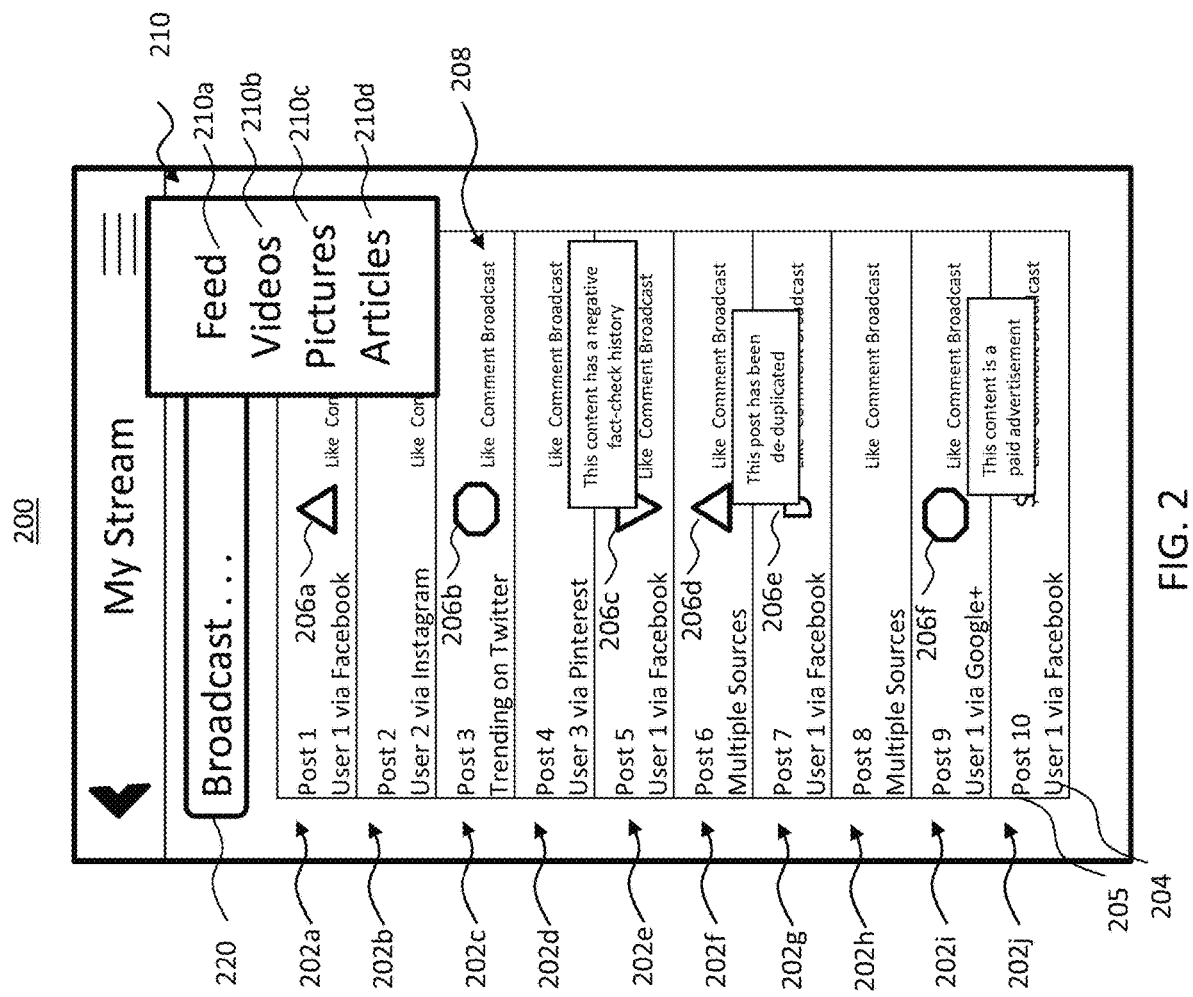
FIGS. 2 and 3 show exemplary user interfaces for presenting social media content from and broadcasting posts to various social media sources, in accordance with some embodiments.

FIG. 2 shows an exemplary user interface 200 for presenting posts from and broadcasting posts to various content sources, in accordance with some embodiments. Posts may be curated and provided to the client device (e.g., client device 102) as described above and presented within the user interface of FIG. 2. Each post, which may include or link to one or more digital content items as described above, may be presented on the display in an easily readable format. As shown in FIG. 2, posts 202a-202j are displayed in list format, although other formats (e.g. a grid view or whole-page view) are contemplated. The user may choose to interact with one of posts 202a-202j (e.g. to read the full post or to consume a digital content item associated with the post) by choosing the post on the display. A user may choose a post by clicking on the post if interacting with the client device using I/O devices such as a keyboard and mouse, or by touching the post if interacting with a touch-sensitive display of the client device, for example.

Each of posts 202a-202j may indicate the source of the post (e.g., one of content sources 108 of FIG. 1) and various other information about the post, including, for example the user or users who shared and/or generated the post 204, a summary of the post 205 (e.g., a short text summary with or without a related image or video), one or more flags 206 as discussed above, and one or more buttons 208 that may be actuated to easily interact with the post (e.g., in order to like the post, comment on the post, and/or broadcast the post as disclosed above. In some embodiments, a user may also be able to filter the list of posts using filters 210a-210d such that only posts with videos, pictures, and/or articles are displayed in the user interface by choosing the appropriate filter from filter menu 210 as shown in FIG. 2, for example.

As described above, identical or similar posts received at the client device may be either de-duplicated or combined into a single post. In the event that the post indicates that it was received from multiple sources, choosing the post may cause the user interface to display a list of the similar or identical posts such that the user can choose which a particular source for the post. In the event that a particular post was de-duplicated, a de-duplication flag 206e may be displayed to alert the user that additional sources may be available for consuming the post. This feature may be useful, for example, for similar posts that treat the same subject differently (e.g., posts that link to two news articles from different sources covering the same event). Choosing de-duplication flag 206e a user may be presented with a second user interface that lists the de-duplicated posts or links to the de-duplicated posts.

A user may also choose to interact with the flags to receive more information about the post. For instance, the user interface displayed in FIG. 2 uses upwardly pointing tri-angles, flags 206a, 206d, to indicate that the post has a positive fact-check history while downward pointed tri-angles, flag 206c, may indicate that the post has a negative fact-check history. Fact checking data may be imported, for example, from an independent third-party source that pro-vides fact checking services for articles, advertisements, political claims, etc. As another example, a stop-sign shaped flag 206b, 206f may indicate that the content associated with the flag is unsuitable for some audiences (e.g., because it contains adult content, strong language, violence, etc.).

Figure 3:
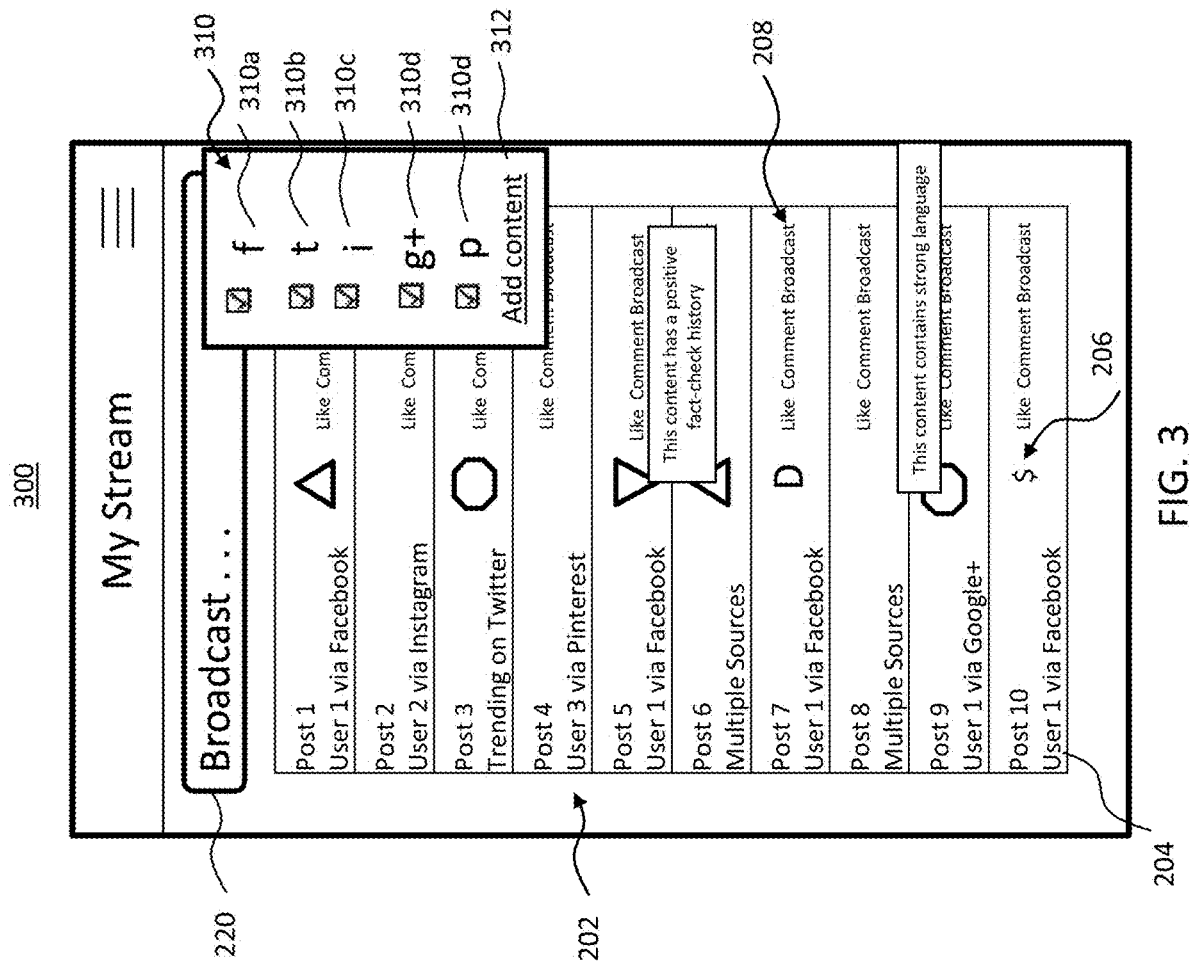

FIG. 3 shows an exemplary user interface 300 for pre-senting posts from and broadcasting posts to various content sources, in accordance with some embodiments. In particu-lar, FIG. 3 shows the user interface of FIG. 2 except that the filtering menu has been replaced with a broadcast platform selection menu, which may be displayed when the user chooses or begins to type in the 'Broadcast . . . ' box 220. The platform selection menu may provide the user with options for choosing which of platforms 310a-310e should receive the broadcast. The user may also be given the option to add her own digital content item to the broadcast by choosing add content option 312. A similar menu may be displayed if the user chooses to broadcast a post in the list of posts.

FIG. 4 shows an illustrative flowchart of process 400 for presenting social media content from and broadcasting posts to various social media sources, in accordance with some embodiments. Process 400 may begin at step 401 in which posts are received from social media sources. The posts may be received at a content clearinghouse server (e.g., content clearinghouse server 106 of FIG. 1) from various content sources (e.g., content sources 108 of FIG. 1).

At step 403, the content clearinghouse server can aggre-gate the posts. Aggregating the posts may involve assigning points to and ranking the posts as described above with respect to FIG. 1. Posts with less than a threshold number of points may be discarded such that they will not be trans-mitted to a client device.

At step 405, the content clearinghouse server may de-duplicate and/or combine similar posts. De-duplicating posts may involve parsing text associated with the digital content item (e.g., from the body of the digital content item or from metadata associated with the digital content item) and/or comparing keywords, hashtags, quotations, date of genera-tion, content source, and/or other attributes of the potentially duplicative digital content items. For example, all posts tagged with the same hashtag might be considered dupli-cates even if the posts are not identical. When such duplicate posts are received at the content clearinghouse server, the server can either delete duplicate posts (e.g. duplicate posts that are not from the user's preferred digital content source) or combine bundle the duplicate posts into a bundled digital content item for transmission to a client device.

At step 407, the content clearinghouse server may attach one or more flags to each post. The flags may communicate additional information about each post, such as its fact checking history, whether it may contain content that is inappropriate for some users, whether the post has been de-duplicated, and whether the content associated with the post is an advertisement. In some embodiments, content clearinghouse server may receive information sufficient to generate one or more flags from the content source that originated the post. In other embodiments, the content clearinghouse server can consult a third-party database that stores information sufficient to generate one or more flags. In still other embodiments, the content clearinghouse server can provide analysis of the post to determine whether one or more flags are appropriate (e.g. the server can parse text associated with the post for objectionable language).

At step 409, the content clearinghouse server may provide the remaining posts to one or more client devices along with at least the point total for each post. The content clearing house server can send the data using a transmitter over a network (e.g. network 104 of FIG. 1) to the one or more client devices.

FIG. 5 shows an illustrative flowchart of process 500 for presenting social media content from and broadcasting posts to various social media sources, in accordance with some embodiments. Process 500 may begin at step 501 in which a content clearinghouse server (e.g., content clearinghouse server 106 of FIG. 1) can receive a broadcast post from a client device (e.g., client device 102 of FIG. 1). The broad-cast post may be a single post generated at and/or shared from the client device for transmittal to more than one communications platform. The broadcast post may include at least the post, one or more digital content items associated with the post, and data regarding which platforms the broadcast post is to be transmitted.

At step 503, the content clearinghouse server may deter-mine an audience for the broadcast. The audience may include a list of all individuals who would receive the broadcast post if the post was broadcast to all platforms without de-duplication. Therefore, separate lists of those individuals may be obtained for each platform and cross-referenced against one another. In some embodiments, the lists could be kept in a database stored on the content clearinghouse server.

At step 505, the content clearinghouse server may de-duplicate the broadcast posts. De-duplicating the broadcast posts can involve cross-referencing the separate lists obtained for each platform to ensure, as practicable, that each individual only receives the post via its preferred contact method (or via the broadcasting user's preferred contact method). Thus, even if a particular individual would otherwise receive the broadcast post on five different platforms, after de-duplication, the user might only receive the broadcast post on a single platform.

At step 507, the content clearinghouse server may format the posts as appropriate for each platform. For example, for one platform, the content clearinghouse server can remove digital content items, such as images or videos, from the post. For another platform, the content clearinghouse server might reduce the number of characters associated with the post. For yet another platform, the content clearinghouse server might embed digital content items from a content source (e.g., a news website) linked to in the post.

Figure 6A:
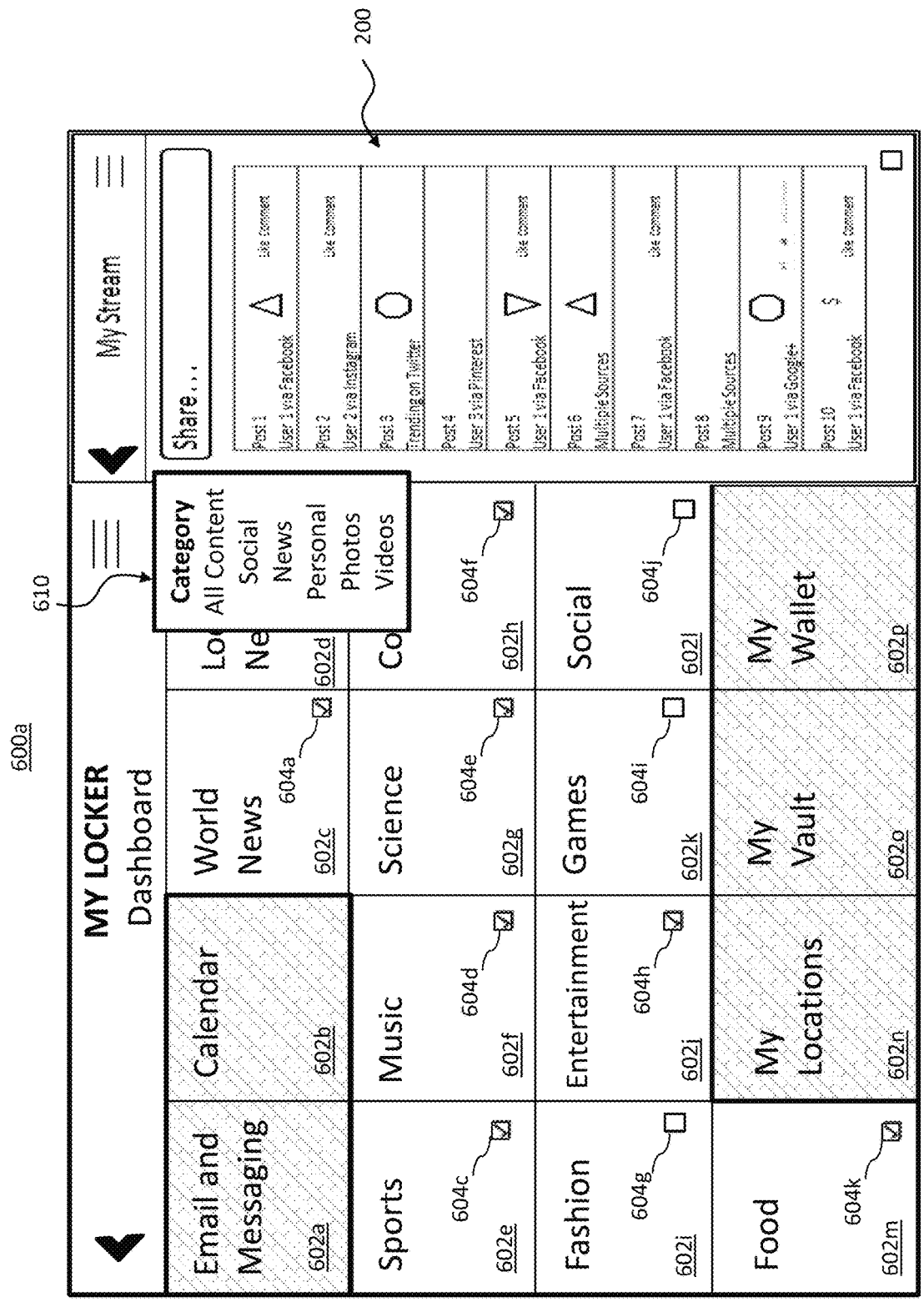
FIGS. 6A, 6B and 7 show exemplary user interfaces for gathering, organizing, and sharing a user's digital content, in accordance with some embodiments.

FIG. 6A shows exemplary user interface 600a for gathering, organizing, and sharing a user's digital content, in accordance with some embodiments. In particular, user interface 600a may be a dashboard for providing a user access to digital content items and can be displayed on a client device (e.g., client device 102 of FIG. 1). The digital content items may include a user's personal digital content (e.g., email, calendar data, photos, videos, documents, etc.) stored locally on the client device or remotely on another client device or on one or more cloud storage servers. The digital content items may also include digital content items received from various content sources (e.g., content sources 108 of FIG. 1) accessible to the client device via a network (e.g., network 104 of FIG. 1). The dashboard can therefore compile substantially all the digital content a user may wish to consume in one convenient location.

The digital content presented in the dashboard may be organized in a number of different formats. As shown in user interface 600, the digital content may be organized according to categories 602a-602p. Thus, all of a user's email and messaging may be accessed by choosing the 'Email and Messaging' category, the user's calendar may be accessed by choosing the 'Calendar' category, digital content items related to sports (e.g., scores, articles, etc.) may be accessed by choosing the 'Sports' category, and so on. Choosing a particular category may result in a second user interface being presented to the user on the client device, such as user interface 700 of FIG. 7, for example.

Digital content items may be arranged into categories in any suitable manner. In some embodiments, a content clearinghouse server (e.g., content clearinghouse server 106 of FIG. 1) may receive digital content items from one or more content sources. The content clearinghouse server can then determine how to categorize the digital content item based on a number of factors, including the identity of the content source or the subject matter of the digital content item as determined based on keywords parsed from the content item itself or from metadata associated with the content item. For instance, if a recipe is received at the content clearinghouse server from a food website, the digital content item could be classified under a category dedicated to 'Food.' Similar categorizations may be provided, for example, for world news, local news, music, science, comedy, fashion, entertainment, games, and social media.

Further categories may also be provided for organizing personal data beyond just the user's email and messaging and calendar data. These personal data categories may require at least one authentication step (e.g., entering a username/password, providing biometric authentication, etc.) before access is permitted in order to prevent a third party from accessing the user's personal data. In user interface 600, personal categories are shaded to provide visual distinction between these categories and the other, nonpersonal categories. However, it should be understood that the categories may be presented to the user in any format, including formats that do not visually distinguish personal categories from nonpersonal categories.

A personal category may be provided for allowing a user to access his location data. The location data may include a log of the user's locations as compiled by communications devices inside one or more of the user's client devices (e.g., GPS receivers, WiFi transceivers, cell transceivers, etc.). The location data may be presented in any number of suitable formats, including a location log, a map-based location visualization, etc.). The location data may further include data regarding the locations of one or more other users. For example, a parent may be able to access the locations of one or more of her children in a similar manner to how she can track her own location.

Another category 602o, designated My Vault in user interface 600, may be provided for permitting access to a user's important, secret, confidential, or otherwise private data. Such a category may require more stringent authentication methods (e.g., two-factor authentication). The data accessible in My Vault may include digital copies of important documents, such as identification documents, tax returns, bank statements, confidential business documents, or any other digital content item the user wishes to protect. My Vault may also store the user's credentials for logging into one or more content sources (e.g., bank accounts, email accounts, news websites, etc.). These credentials may be consulted by the content clearinghouse server as necessary to receive content from username/password protected content sources.

Still another personal category 602p may be provided for storing one or more of a user's payment methods, designated 'My Wallet' in user interface 600. My Wallet may store, for example, information for one or more credit cards, online payment accounts, digital currency accounts, etc. Information stored in My Wallet may be used to effect payment for one or more items purchased via the content clearinghouse server. For example, if a digital content item received at the content clearinghouse server permits the user to purchase goods or services, the content clearinghouse server may, at the direction of the user using the client device, consult the payment information stored in My Wallet in order to arrange payment for the purchase.

User interface 600a may include menu 610 that presents options that facilitate changing digital content is displayed in the dashboard. For example, rather than displaying digital content by category, a user may choose to have the user interface display all of the available digital content at once. This display method may bear some resemblance to user interface 200 of FIG. 2, in that various digital content items may be presented in list format. The digital content items may be awarded points as described above with respect to FIG. 1 in order to determine which digital content items to present on the client device as well as to prioritize the presentation of the digital content items in the user interface. The user may also invoke the menu to filter an All-Content view down to certain types of content, such as social media posts, news articles, personal data, photos, or videos, for example. The dashboard may also include a stream or feed of posts 200 as described above with respect to FIGS. 1-3 to provide the user with quick access to posts he may wish to consume.

In some embodiments, the user may choose to share at least a portion of her dashboard with third parties. Accordingly, one or more third parties (e.g., other users with accounts tied to the content clearinghouse server or members of the public at large without such an account) may be given permission to view the same digital content items as have been compiled, curated, and organized for the user of the client device. In this manner, one or many users may be permitted to "follow" the digital content consumption of another user. In some embodiments, a third party may also be able to copy at least a portion of a shared dashboard in order to begin compiling their own dashboard. For both the sharing and viewing/compiling aspects, reference to user interface 600 may be instructive.

To share a user's dashboard, the user may interact with one or more public/private flags 604a-604k displayed in user interface 600a (shown as empty boxes for private categories and checked boxes for public categories). Categories that have been shared may be either publically or semi-publically available for viewing and/or copying by third parties. In keeping with the definitions provided above, public accessibility may represent access that is not restricted to a particular audience, while semi-public accessibility may refer to access that is restricted to a class of users, such as contacts, friends, etc. As shown in user interface 600, the user has chosen to make several of her categories public (or semi-public) (i.e., World News, Local News, Sports, Music, Science, Comedy, Entertainment, and Food) and has chosen to make several of her categories private (i.e., Fashion, Games, and Social). For security purposes, personal categories may not be made public or semi-public.

When a user shares his dashboard, at least some of his user preferences (whether manually entered or as gleaned by the content clearinghouse server) may be made public as well, such that any third parties wishing to copy a portion of his dashboard may receive the same or similar digital content that the user receives can access via the dashboard. It should be understood, however, that some of the user's preferences or information may remain private, such as user log-in credentials for one or more content sources, for example.

When a third party views the user's dashboard, she may be presented with a user interface very similar to user interface 600 except that the personal categories and the private categories may not be displayed. Accordingly, she may only be able to view the categories the user has marked public. In some embodiments, the third party may be given restricted access to the user's actual dashboard, such that every digital content item accessible to the user may also be accessed by the third party (e.g., even if the digital content item requires the user's log-in credentials). In other embodiments, however, the content clearinghouse server may make a copy of the user's dashboard and present the copy to the third party. In that case, the third party may not be able to access digital content items that require the user's log-in credentials (unless the third party also has valid credentials to the content source from which the digital content item was received, or if the digital content item itself was also copied when the user's dashboard was copied.

According to some embodiments, the third party may choose to compile his own dashboard based on the user's dashboard. For example, for each displayed category the user may be permitted to check a box displayed on his view of the user's dashboard, which can result in that category being added to the user's own dashboard. If the user does not have a valid account for accessing the content clearinghouse server, attempting to add a user's category to his dashboard may result in the third party being prompted to create an account. In the event that a third party attempts to add a similar category from two different users, the content clearinghouse server may determine whether the user preferences that will be imported from each user can be combined (e.g., by concatenating lists of content sources and preferences imported from each user). If the user preferences cannot be combined, the user may be prompted to choose to follow one user's version of the category.

Once a user has compiled a dashboard, which may be based on a combination of user-defined categories and categories compiled from other or more other users, the user's own preferences may begin to affect how digital content items are curated. That is, even if a user compiled her entire dashboard based on the dashboards of other users, the digital content items ultimately transmitted to the user may begin to diverge from those transmitted to the original user's based on how the user interacts with the digital content items. In some embodiments, however, the user may be permitted to "lock" one or more of her categories with another user's categories to ensure that she receives the same digital content items as that other user does. Locking a category may involve either periodically synchronizing a third party user's preferences associated with the category to ensure that the same or similar digital content items are delivered to the third party or allowing the third-party to directly access the user's dashboard (or a recent copy of the user's dashboard) with respect to that category.

Figure 10B:
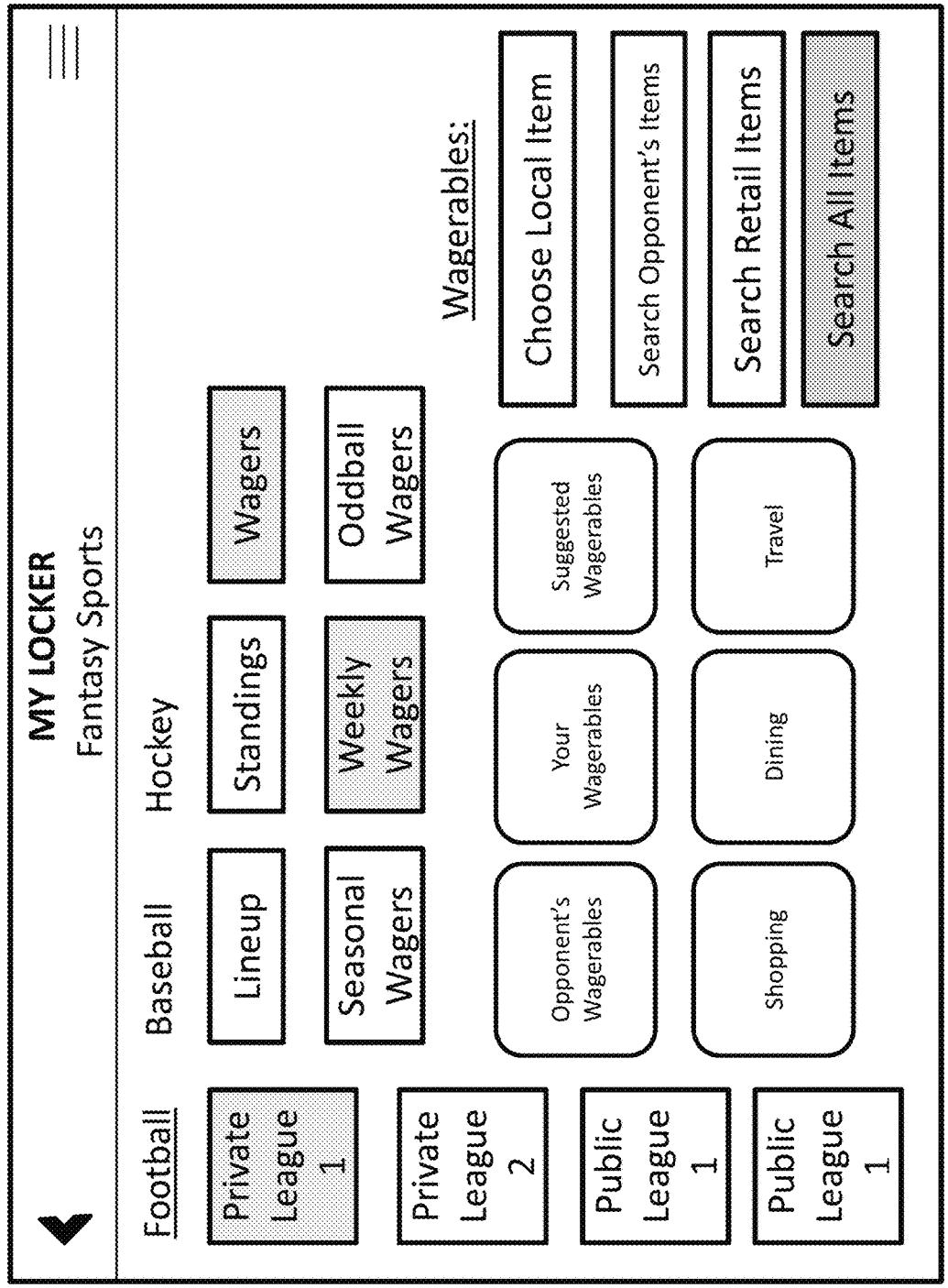
Figure 10C:
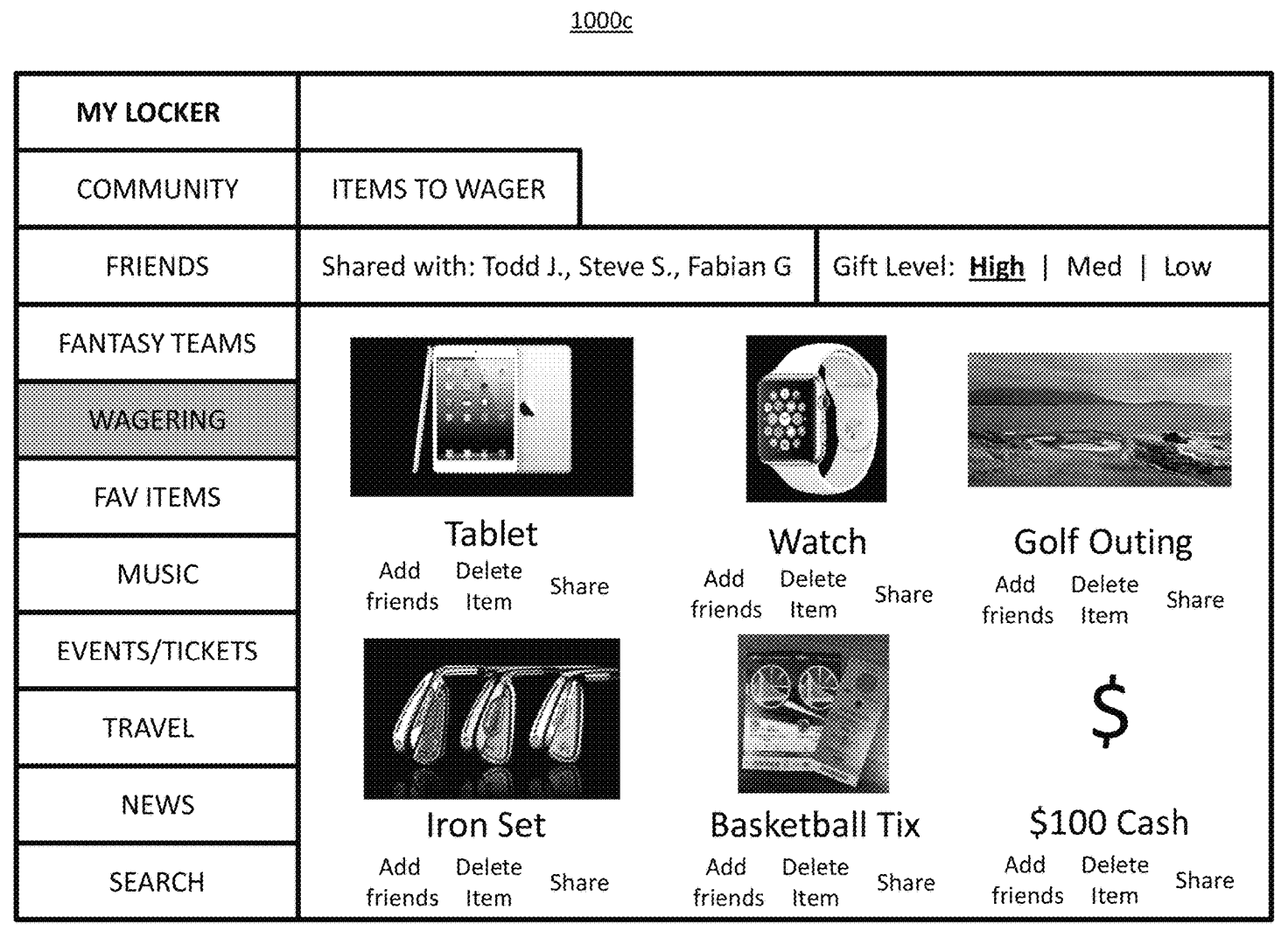

Digital content items accessible via the various categories in the dashboard may be tracked, shared, traded, or offered for sale to personal contacts or to the public at large. For example, digital media items, such as songs or videos may be made accessible through user interface 600, and these items may be traded or offered for sale to others. In one example, a user may place a selection of music files up for sale or trade, and other users may be permitted to browse the selection and purchase the files directly from the user. The content items may also represent real-world goods or services. Examples of real-world goods might be an individual's inventory of tools, supplies, or automobiles she wishes to track or offer for sale or trade. Accordingly, a user may use the systems and methods disclosed herein to keep track of personal effects and offer up the items for perusal, sale, or trade. In further embodiments, real-world and purely digital content items may be wagered, as disclosed in more detail below with respect to FIG. 10.

Figure 6B:
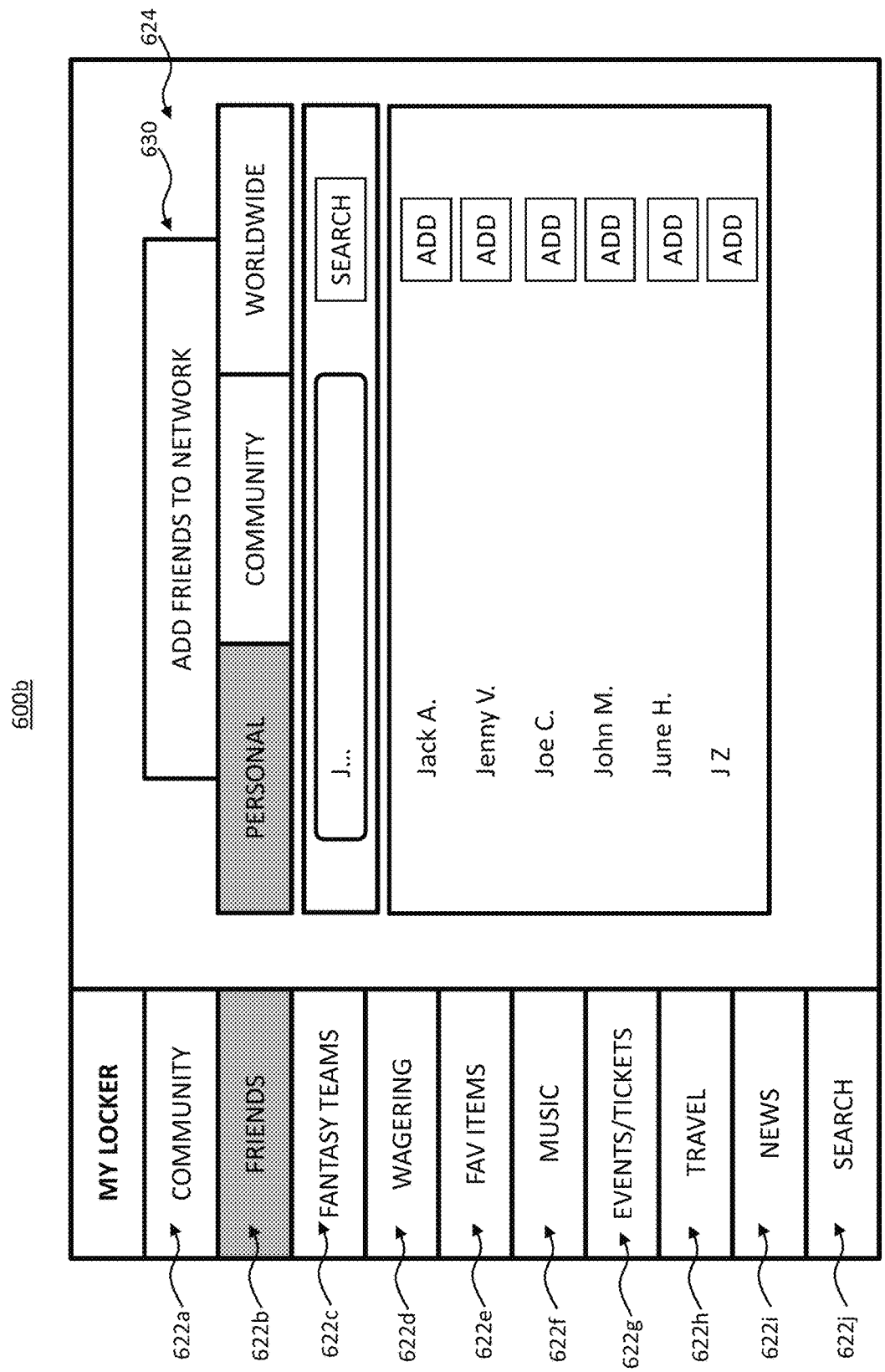

FIG. 6B shows exemplary user interface 600b for gathering, organizing, and sharing a user's digital content, in accordance with some embodiments. In particular, user interface 600b may represent an alternative version of the dashboard depicted in FIG. 6A. Categories 622a-622j may be arranged in a sidebar next to content panel 624. Also depicted in FIG. 6b is a specialized user interface 630 for connecting with friends (e.g. contacts, individuals in the user's community, and individuals located worldwide). Connecting with friends in this manner facilitate interaction between the user and other individuals using the systems and methods disclosed herein.

Figure 7:
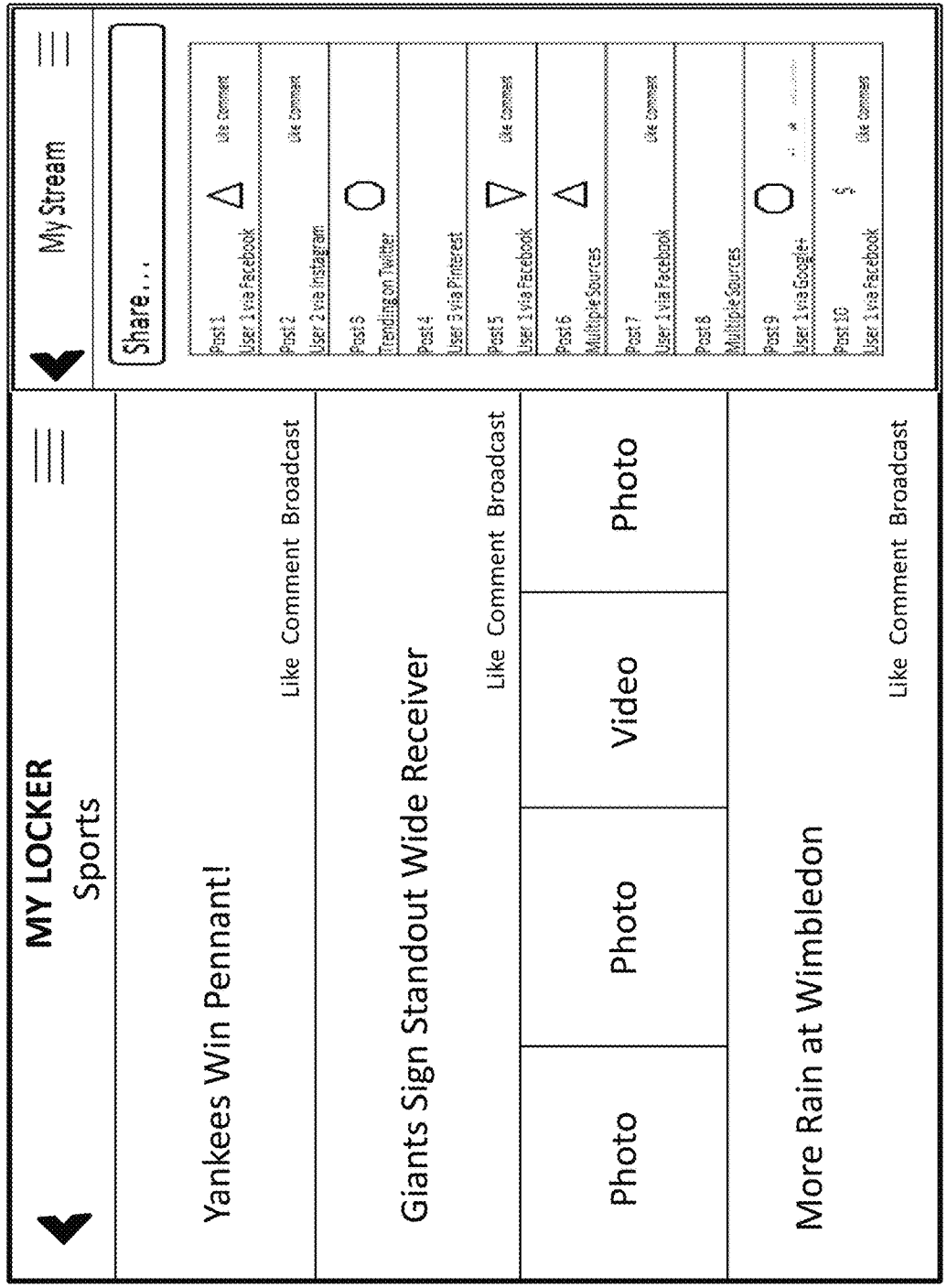

FIG. 7 shows exemplary user interface 700 for gathering, organizing, and sharing a user's digital content, in accordance with some embodiments. In particular, user interface 700 may be a user interface for interacting with digital content items associated with a particular category as described above with respect to FIG. 6. User interface 700 may be presented to the user on the client device, for example, if the user chooses the 'Sports' category in user interface 600. Digital content items 702a-702c (representing articles) and 704a-704d (representing photos and videos) may include various articles likely to be of interest to the user (e.g., based on the number of points the articles were awarded by the content clearinghouse server), and various multimedia items, such as photos and videos, of sporting content the user is likely to be interested in.

FIG. 8 shows an illustrative flowchart of process 800 for gathering, organizing, and sharing a user's digital content, in accordance with some embodiments. Process 800 may begin at step 801, in which preference data may be received at a content clearinghouse server (e.g., content clearinghouse server 106 of FIG. 1) from the client device (e.g., client device 102 of FIG. 1) of a user over a network (e.g., network 104 of FIG. 1). The preference data may include indications of interest in receiving digital content from one or more known content sources (e.g., content sources 108 of FIG. 1) and/or one or more content categories.

At step 803, the content clearinghouse server can obtain digital content based at least on the preference data. The digital content may be received from content sources accessible to the content clearinghouse server via the network and/or digital content items received from the client device via the network.

At step 805, the content clearinghouse server may transmit the digital content to one or more client devices for display in a dashboard user interface (e.g., user interface 600 of FIG. 6). The digital content can be categorized to permit the user to easily find content of interest via the dashboard.

At step 807, the content clearinghouse server can receive dashboard sharing preferences from the user. The sharing preferences may indicate sharing setting for one or more of the user's categories (e.g. by using public/private flags 604a-604k of FIG. 6). For example, each of the user's categories may be given be associated with a public, semi-public, or private sharing preference.

At step 809, the content clearinghouse server may permit access of a shared portion of the dashboard to one or more other users based on the sharing preferences. Permitting access to the shared portion of the dashboard may involve permitting direct access to the dashboard or creating a copy of the dashboard for the one or more other users to access, for example.

FIG. 9 shows an illustrative flowchart of process 900 for gathering, organizing, and sharing a user's digital content, in accordance with some embodiments. Process 900 may begin at step 901, in which a third party can access a user's digital content dashboard via a content clearinghouse server (e.g., content clearinghouse server 106 of FIG. 1). In some embodiments, only a portion of the user's dashboard may be accessible to the third party (e.g., as based on the user's sharing preferences).

At step 903, the content clearinghouse server can compile a dashboard for the third party based on at least one of the user's categories. For instance, the third party may check a box displayed on her view of the user's dashboard, which can result in that category being added to the third party's dashboard. If the third party does not have a dashboard, the content clearinghouse server may create a new dashboard for the third party.

At step 905, the content clearinghouse server can transmit digital content items to a client device of the third party for display in a dashboard user interface. The digital content items may be transmitted via a network connecting the content clearinghouse server and the client device, such as network 104 of FIG. 1, for example.

At step 907, the content clearinghouse server may receive instructions to lock one or more of the categories of the third party's dashboard. When a category is locked, the content clearinghouse server may either transfer the user preferences associated with the category to the third-party's client device such that the content received at the third party's dashboard is identical to the content received at the user's dashboard (at least until the third-party changes its own user preferences). The content clearinghouse server may also periodically synchronize the third-party's dashboard with the user's dashboard so that the locked category remains in sync despite changes in the third-party's user preferences.

FIGS. 10A-10D show exemplary user interfaces 1000a-1000d, respectively, for gathering, organizing, and sharing a user's digital content, in accordance with some embodiments. In particular, user interface 1000 may represent a user interface for competing in games of skill, such as fantasy sports, user interface 1000b may represent a user interface used for wagering in those games of skill, user interface 1000c may represent a user interface used for browsing items to wager, and user interface 1000d may represent a user interface for recording current wagers and outcomes of past wagers.

It is common in such games of skill to wager on the overall outcome whereby a monetary "buy-in" is split up amongst the best performing user according to various categories (e.g., $1^{st}$ place overall in a playoff format, highest scoring overall, etc.). However, such games of skill may be made more compelling if the wagering was more flexible. Accordingly, flexible wagering terms are contemplated, including wagering on face-to-face matchups (e.g., a weekly one-on-one matchup in a fantasy football league), overall results (e.g., the individual with the best record or the highest aggregate score over the course of a season), or "oddball" events where the outcome may be dependent on the occurrence of a rare event (e.g., a safety in a football game, a disparity in a one-on-one matchup exceeding a certain value or less than a certain value).

Using the systems and methods described herein, individuals may be able to wager digital content items, such as the digital content items accessible via user interface 600, which may represent actual digital content items (e.g., digital audio or video files), links to digital content items (e.g., a link to a download source for a digital content item), links to a real-world item (e.g., a link to an online retailer for a particular real-world good or service), or a digital content item that represents a real-world object (e.g., a bottle of wine from the individual's personal collection). Where the wagered digital content item is an actual digital content item, a link to a digital content item, or a link to a real-world item, ownership of the digital content item may be transferred to the winning party immediately upon the result being finalized. In some embodiments, any payment required for the digital content item (e.g., payment for a real-world object to be ordered from an online retailer) may be paid in advance such that as soon as ownership is transferred, the prevailing party can access their winnings.

Each party to a particular wager may choose the digital content item to wager (e.g., from the party's own personal dashboard), pick a digital content item from the opposing party's available digital content items (e.g., by browsing through the opposing party's shared dashboard), have one or more digital content items suggested to them (e.g., by a content clearinghouse server 106), or combinations of the above. In any case, both parties may be required to approve the terms before the deal is finalized; if no agreement is made, any proposed deal may be void or voidable by either party. Agreed upon deals may also be voidable by either party if a material change in circumstances occurs after entering into the deal (e.g., a star player becoming inactive for a particular game).

In some embodiments, a content clearinghouse server may suggest items to be wagered. The suggestion may take into account the parties' known predilections as gleaned from their interactions with a content clearinghouse server (e.g., content clearinghouse server 106), a dashboard (e.g., user interface 600), and/or a questionnaire filled out by one or both of the parties that details their likes and dislikes. Suggestions made by the content clearinghouse server may be valued within a range defined by the parties or by a league (e.g., each digital content item must have a value between $10 and $100), and the relative values for wagered digital content items between two opposing parties may be determined as a function of a handicap calculated for the particular wager. For example, the handicap may be based on the odds of one player prevailing, given projected point values in a head-to-head match-up, for example. In other embodiments, digital content items of substantially equal value may be wagered, but the favored team may be required to cover a "spread" based, for example, on projected point values.

While there have been described systems and methods for compiling, curating, and sharing digital content, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A content clearinghouse server, comprising:
a processor, communications circuitry, and a memory, the memory comprising sequentially-performed instructions of:
receiving, using the communications circuitry, a plurality of posts from a plurality of content sources via a network;
aggregating, using the processor, the plurality of posts by determining a point-based relevance metric for each post of the plurality of posts received from the plurality of content sources to estimate a likelihood that each post is relevant to a user's interests, wherein
the point-based relevance metric comprises an initial score calculated using the number of interactions of the post of the point-based relevance metric by others other than the user, whether the post was generated or shared by one or more contacts of the user, and a frequency with which the user previously interacted with similar posts, wherein the initial score increases as a function of a date- and time-based point multiplier that is an integer greater than one, and wherein the initial score decreases as a function of time;
discarding, using the processor, each post of the plurality of posts with less than a threshold number of points of the point-based relevance metric;
de-duplicating, using the processor, the plurality of non-discarded aggregated posts to generate one de-duplicated post only by parsing text of each aggregated post of the plurality of aggregated posts, wherein the text being parsed is located in one of a body of the post and metadata associated with the post;
bundling together, using the processor, duplicate posts of the plurality of non-discarded aggregated posts, which excludes the one de-duplicated post, to generate a bundled digital content item;
attaching to the one de-duplicated post, using the processor, a first flag if fact checking for the one de-duplicated post is available, a second flag if for the one de-duplicated post is inappropriate for children, a third flag indicative of the one de-duplicated post being the one de-duplicated post, and a fourth flag if the one de-duplicated post that is an advertisement; and
transmitting, using the communications circuitry, the one de-duplicated post, the bundled digital content item, and value of the point-based relevance metric to a client device of the user, wherein each of these are viewable on the client device.

2. The content clearinghouse server of claim 1, wherein the plurality of posts received from the plurality of content sources are received based on user preferences stored in the memory, wherein the user preferences indicate the user's interest in at least one content category.

3. The content clearinghouse server of claim 1, wherein posts are further de-duplicated by comparing at least one of keywords, hash tags, quotations, generation dates, and the content source associated with each post of the plurality of posts with others of the plurality of posts.

4. The content clearinghouse server of claim 1, wherein at least one of the first, second, third and fourth flags is generated from information received from one of the plurality of content sources.

5. The content clearinghouse server of claim 4, wherein the at least one of the first, second, third and fourth flags is further generated from information received from a third-party database.

6. The content clearinghouse server of claim 1, wherein the plurality of posts received from the plurality of content sources are received based on user preferences stored in the memory, the user preferences indicating the user's interest in at least one of the plurality of content sources.

7. A sequentially-performed method for sharing digital content performed by content management server, comprising:
receiving a plurality of posts from a plurality of content sources via a network;
aggregating the plurality of posts by determining a point-based relevance metric for each post of the plurality of posts received from the plurality of content sources to estimate a likelihood that each post is relevant to a user's interests, wherein
the point-based relevance metric comprises an initial score calculated using the number of interactions of the post of the point-based relevance metric by others other than the user, whether the post was generated or shared by one or more contacts of the user, and a frequency with which the user previously interacted with similar posts, wherein the initial score increases as a function of a date- and time-based point multiplier that is an integer greater than one, and wherein the initial score decreases as a function of time;
discarding each post of the plurality of posts with less than a threshold number of points of the point-based relevance metric;
de-duplicating, using the processor, the plurality of non-discarded aggregated posts to generate one de-duplicated post only by parsing text of each aggregated post of the plurality of aggregated posts, wherein the text being parsed is located in one of a body of the post and metadata associated with the post;

bundling together, using the processor, duplicate posts of the plurality of non-discarded aggregated posts, which excludes the one de-duplicated post, to generate a bundled digital content item;

attaching to the one de-duplicated post, using the processor, a first flag if fact checking for the one de-duplicated post is available, a second flag if for the one de-duplicated post is inappropriate for children, a third flag indicative of the one de-duplicated post being the one de-duplicated post, and a fourth flag if the one de-duplicated post that is an advertisement; and transmitting, using the communications circuitry, the one de-duplicated post, the bundled digital content item, and value of the point-based relevance metric to a client device of the user, wherein each of these are viewable on the client device.

* * * * *